(12) United States Patent
Tashiro et al.

(10) Patent No.: US 10,519,967 B2
(45) Date of Patent: Dec. 31, 2019

(54) SEAL RING MOUNTING METHOD FOR TURBOCHARGER, AND TURBOCHARGER

(75) Inventors: Naoto Tashiro, Tokyo (JP); Yasuaki Jinnai, Tokyo (JP); Hiroyuki Arimizu, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 626 days.

(21) Appl. No.: 14/232,537

(22) PCT Filed: Sep. 7, 2012

(86) PCT No.: PCT/JP2012/072890
§ 371 (c)(1),
(2), (4) Date: Feb. 10, 2014

(87) PCT Pub. No.: WO2013/042554
PCT Pub. Date: Mar. 28, 2013

(65) Prior Publication Data
US 2014/0241858 A1    Aug. 28, 2014

(30) Foreign Application Priority Data
Sep. 22, 2011 (JP) ................................ 2011-206987

(51) Int. Cl.
*F04D 29/08* (2006.01)

(52) U.S. Cl.
CPC ....... *F04D 29/083* (2013.01); *Y10T 29/49236* (2015.01)

(58) Field of Classification Search
CPC ........ F01D 17/14; F01D 17/143; F01D 17/16; F01D 17/165; F01D 17/167; F02B 37/24; F02C 6/12; F05D 2220/40; F05D 2250/90
See application file for complete search history.

(56) References Cited

U.S. PATENT DOCUMENTS

| 4,770,603 A | * | 9/1988 | Engels ................. F01D 5/141 415/147 |
| 6,928,816 B2 | * | 8/2005 | Leavesley ............. F01D 17/14 415/158 |

(Continued)

FOREIGN PATENT DOCUMENTS

| CN | 1818359 A | 8/2006 |
| CN | 101395358 A | 3/2009 |

(Continued)

OTHER PUBLICATIONS

Chinese Office Action and Search Report, dated Jun. 1, 2015, for Chinese Application No. 201280034314.2, along with English translations.

(Continued)

*Primary Examiner* — Jason D Shanske
*Assistant Examiner* — Julian B Getachew
(74) *Attorney, Agent, or Firm* — Birch, Stewart, Kolasch & Birch, LLP

(57) ABSTRACT

It is intended to provide a seal ring mounting method for a turbocharger and a turbocharger with the seal ring, whereby the seal ring is less likely to be affected by other parts. An annular protrusion (12j) for restricting a position of a seal ring (16) in the radial direction is provided at a tip portion (12h) of an inner peripheral wall (12b) of a turbine housing (12), and the seal ring (16) is mounted between a side surface (36c) of a nozzle plate (36) and a first step portion (12k) of the tip portion (12h) of the inner peripheral wall (12b) so that the outer periphery of the seal ring (16) is restrained by the annular projection (12j).

4 Claims, 8 Drawing Sheets

(56) References Cited

U.S. PATENT DOCUMENTS

| | | | | |
|---|---|---|---|---|
| 7,351,042 | B2* | 4/2008 | Jinnai | F01D 17/165 415/134 |
| 7,918,023 | B2* | 4/2011 | Sausse | F01D 9/04 29/889.2 |
| 2006/0188368 | A1 | 8/2006 | Jinnai et al. | |
| 2009/0060737 | A1 | 3/2009 | Frankenstein et al. | |
| 2009/0092483 | A1* | 4/2009 | Yasui | F01D 17/165 415/159 |
| 2009/0317247 | A1 | 12/2009 | Hoecker et al. | |
| 2010/0166541 | A1 | 7/2010 | Hausser et al. | |

FOREIGN PATENT DOCUMENTS

| | | |
|---|---|---|
| DE | 10 2008 029 080 A1 | 12/2009 |
| EP | 1691034 A2 | 8/2006 |
| EP | 2199570 A2 | 6/2010 |
| EP | 2226484 A1 | 9/2010 |
| JP | 2006-125588 A | 5/2006 |
| JP | 2006-220053 A | 8/2006 |
| JP | 2009-47027 A | 3/2009 |
| JP | 2009-228450 A | 10/2009 |
| JP | 2010-90713 A | 4/2010 |
| JP | 2010-96110 A | 4/2010 |
| JP | 2010-190092 A | 9/2010 |

OTHER PUBLICATIONS

Extended European Search Report, dated Jun. 12, 2015, for European Application No. 12832907.5.
International Preliminary Report on Patentability for PCT/JP2012/072890 dated Apr. 3, 2014 with an English translation.
International Search Report for PCT/JP2012/072890 dated Sep. 7, 2012.
Japanese Notice of Allowance for related Application No. JP2011-206987 dated Sep. 20, 2012 with an English translation.
Chinese Notice of Allowance for Chinese Application No. 201280034314.2, dated Jun. 28, 2016, with an English translation.
Notice of Allowance effective Jun. 23, 2016 issued in the corresponding EP Application No. 12832907.5.
Notice of Opposition effective Apr. 19, 2017 issued to the corresponding EP Application No. 12832907.5.

* cited by examiner

Related Art

SEAL RING MOUNTING METHOD FOR TURBOCHARGER, AND TURBOCHARGER

TECHNICAL FIELD

The present invention relates to a seal ring mounting method for a turbocharger and the turbocharger with the seal ring, in which the seal ring is mounted for sealing a gap between a turbine housing and a nozzle plate of a variable nozzle mechanism.

BACKGROUND ART

In a turbocharger which is used for vehicle engines, etc. such a configuration is adopted that exhaust gas from the engine fills a scroll formed in a turbine housing and passes through a plurality of nozzle vanes disposed on an inner peripheral side of the scroll to act on a turbine wheel disposed on an inner peripheral side of the plurality of nozzle vanes.

A plurality of nozzle vanes is disposed between two annular plates (a nozzle mount and a nozzle plate) such that a vane angle can be changed. These nozzle vanes, these two plates and a vane angle changing mechanism for changing vane angles of the nozzle vanes constitute a main part of the variable nozzle mechanism.

The variable nozzle mechanism is configured to change the angle of the nozzle vanes in accordance with the rotation speed of the engine, whereby the flow rate of the exhaust gas through an exhaust gas passage formed between those two plates and the rotation speed of the turbine wheel changes.

The main part of the variable nozzle mechanism is disposed between a turbine housing and a bearing housing which supports a rotation shaft of the turbine wheel. At the assembly, a gap is created between the variable nozzle mechanism (particularly, the nozzle plate) and the turbine wheel. This gap is sealed by mounting a seal ring therein.

As a conventional seal ring mounting method for a turbocharger and as a turbocharger with a seal ring, it has been known to mount a seal member of a disc spring type between a shroud having vanes for directing the exhaust gas to a turbine impeller and a turbine housing side section disposed facing the shroud (for instance, see Patent Document 1).

According to FIG. 1 of Patent Document 1, a shroud 010, as illustrated in FIG. 10 of the attached drawings, is configured by a plurality of vanes 09 for leading to a turbine impeller exhaust gas which is to be introduced to a scroll passage of a turbine housing 01, and two annular plates 09a, 09b which sandwich these vanes 09.

Further, in the turbine housing 01, a shroud opposing part 014 is formed opposite to the shroud 010 and an annular protrusion 027 is formed protruding toward the shroud 010 from an inner edge portion of an end face 014a of the shroud opposing part 014.

Between the shroud 010 and the shroud opposing part 014, a gap 015 is formed. A disc spring seal member 024 is disposed in this gap 015. Specifically, an inner peripheral end 025 of the disc spring seal member 024 is fitted to an outer peripheral surface of the annular protrusion 027 of the shroud opposing part 014 and contacts the end face 014a of the shroud opposing part 014 while an outer peripheral end 026 of the disc spring seal member 024 contacts the plate 09a of the shroud 010.

CITATION DOCUMENT

Patent Document

[Patent Document 1]
JP 2009-47027 A

SUMMARY

Technical Problem

According to Patent Document 1, the annular protrusion 027 is formed on the inner edge portion of the end face 014a of the shroud opposing part 014 in the turbine housing so as to restrict the disc spring seal member 024 in the radial direction. Therefore, when the turbine housing 01 expands due to heat, the outer diameter of the annular protrusion 027 expands as well. Due to this, the annular protrusion 027 may interfere with the inner peripheral end 025 of the disc spring seal member 024, which results in deformation of the disc spring seal member 024.

Therefore, the inner diameter of the inner peripheral end 025 of the disc spring seal member 024 may be set larger. In this case, however, the radial restriction of the disc spring seal member 024 using the annular protrusion 027 becomes loose. For instance, the disc spring seal member 024 is eccentrically mounted on the shroud 010 and the outer peripheral end 026 of the disc spring seal member 024 expectedly comes off from an outer peripheral part of the plate 09a.

In view of the above issues, it is an object of at least one embodiment of the present invention to provide a seal ring mounting method for a turbocharger and a turbocharger with the seal ring whereby the seal ring is hardly affected by other components.

Solution to Problem

To achieve the above object, the present invention provides a seal ring mounting method for a turbocharger which is configured to supply exhaust gas to a turbine wheel arranged on an inner peripheral side of nozzle vanes via a scroll formed in a turbine housing and the nozzle vanes provided on an inner peripheral side of the scroll, wherein an annular nozzle mount and an annular nozzle plate attached to the annular nozzle mount are arranged sandwiching the nozzle vanes on the inner peripheral side of the scroll so as to rotatably support the nozzle vanes and form an exhaust gas passage, an inner peripheral wall of the turbine housing is provided opposing a side face of the nozzle plate to form an inner wall of the scroll, and an annular seal ring is mounted to seal a gap between the side face of the nozzle plate and the inner peripheral wall of the turbine housing. The above seal ring mounting method comprises the step of: mounting the seal ring between the side surface of the nozzle plate and the inner peripheral wall of the turbine housing such that an outer peripheral part of the seal ring is restricted by a radial-direction restriction part which is provided at a tip portion of the inner peripheral wall of the turbine housing so that a position of the seal ring is restricted in a radial direction.

According to the present invention, the seal ring is mounted between the side surface of the nozzle plate and the inner peripheral wall of the turbine housing such that the outer peripheral part of the seal ring is restricted by the radial-direction restriction part. More specifically, the seal ring is mounted such that the outer peripheral part of the seal ring is restricted by the radial-direction restriction part and thus, the seal ring is positioned surely.

Further, it is preferable in the present invention that, in the mounting step, the seal ring is placed on an inner peripheral side of the radial-direction restriction part provided at the tip portion of the inner peripheral wall of the turbine housing, and then a nozzle assembly including the nozzle plate is placed on the turbine housing such as to cover the seal ring by the nozzle assembly.

The seal ring can be placed on the inner peripheral side of the radial-direction restriction part. Thus, compared to the case where the seal ring is placed on an outer peripheral side of the radial restriction part, it is simple to position and amount the seal ring without disposing the seal ring eccentrically, and it is possible to surely mount the seal member in a stable manner. Further, the nozzle assembly is placed on the turbine housing after the seal ring is mounted. Thus, it is possible to perform the assembly simply and reliably.

Moreover, the present invention also provides a turbocharger comprising: a scroll formed in a turbine housing; nozzle vanes provided on an inner peripheral side of the scroll; a turbine wheel arranged on an inner peripheral side of the nozzle vanes; an annular nozzle mount; an annular nozzle plate attached to the annular nozzle mount, the annular nozzle plate and the annular nozzle mount being arranged sandwiching the nozzle vanes on the inner peripheral side of the scroll to rotatably support the nozzle vanes; and an annular seal ring arranged to seal a gap between a side face of the nozzle plate and an inner peripheral wall of the turbine housing, the inner peripheral wall of the turbine housing being provided opposing the side face of the nozzle plate to form an inner wall of the scroll; a radial-direction restriction part provided at a tip portion of the inner peripheral wall of the turbine housing so as to restrict an outer peripheral part of the seal ring in a radial direction. The seal ring is mounted between the side surface of the nozzle plate and the inner peripheral wall of the turbine housing so that the outer peripheral part of the seal ring is restricted by the radial-direction restriction part.

According to the present invention, the outer peripheral part of the seal ring is restricted in a radial direction by the radial-direction restriction part provided at the tip portion of the inner peripheral wall of the turbine housing. Thus, even if the radial-direction restriction part of the turbine housing thermally expands outward in the radial direction, the radial-direction restriction part does not interfere with the seal ring and the thermal expansion of the radial-direction restriction part does not affect the seal ring. As a result, it is possible to prevent deformation of the seal ring.

It is preferable in the present invention that the radial-direction restriction part is constituted by an annular projection projecting from the tip portion of the inner peripheral wall of the turbine housing in a direction along a rotation axis of the turbine wheel.

As the radial-direction restriction part is constituted by an annular projection projecting from the tip portion of the inner peripheral wall of the turbine housing in the direction along a rotation axis of the turbine wheel, the annular projection can be easily formed on the tip portion of the inner peripheral wall of the turbine housing.

It is also preferable in the present invention that the radial-direction restriction part is constituted by an outer peripheral surface disposed at the tip portion of the inner peripheral wall of the turbine housing.

With this configuration, the tip portion of the inner peripheral wall of the turbine housing can have a simple configuration and thus, it is possible to reduce the production cost.

Specifically, a cylindrical portion is formed at a radial-direction outer end of a seal ring body, and the cylindrical portion of the seal ring body is fitted to the outer peripheral surface disposed on the tip portion of the inner peripheral wall of the turbine housing.

It is also preferable in the present invention that the seal ring has a V-shaped cross-section formed such that a center of a width of the seal ring is depressed inward in the radial direction.

As the seal ring has a V-shaped cross-section formed such that the center is depressed inward in the radial direction, an open side of the "V" shape is disposed to face the scroll side. Thus, by using the pressure inside the scroll, the seal ring can be stuck to the side surface of the nozzle plate and to the inner peripheral wall of the turbine housing, thereby enhancing a sealing effect.

Advantageous Effects

As described above, according to the present invention, the radial-direction restriction part is disposed at the tip portion of the inner peripheral wall of the turbine housing so that a position of the seal ring is restricted in the radial direction, and the seal ring is mounted between the side surface of the nozzle plate and the inner peripheral wall of the turbine housing such that the outer peripheral part of the seal ring is restricted in the radial direction by the radial-direction restriction part. Thus, even if the radial-direction restriction part of the turbine housing thermally expands outward in the radial direction, the radial-direction restriction part does not interfere with the seal ring and the seal ring is not affected by the thermal expansion of the radial-direction restriction part. As a result, it is possible to prevent deformation of the seal ring.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
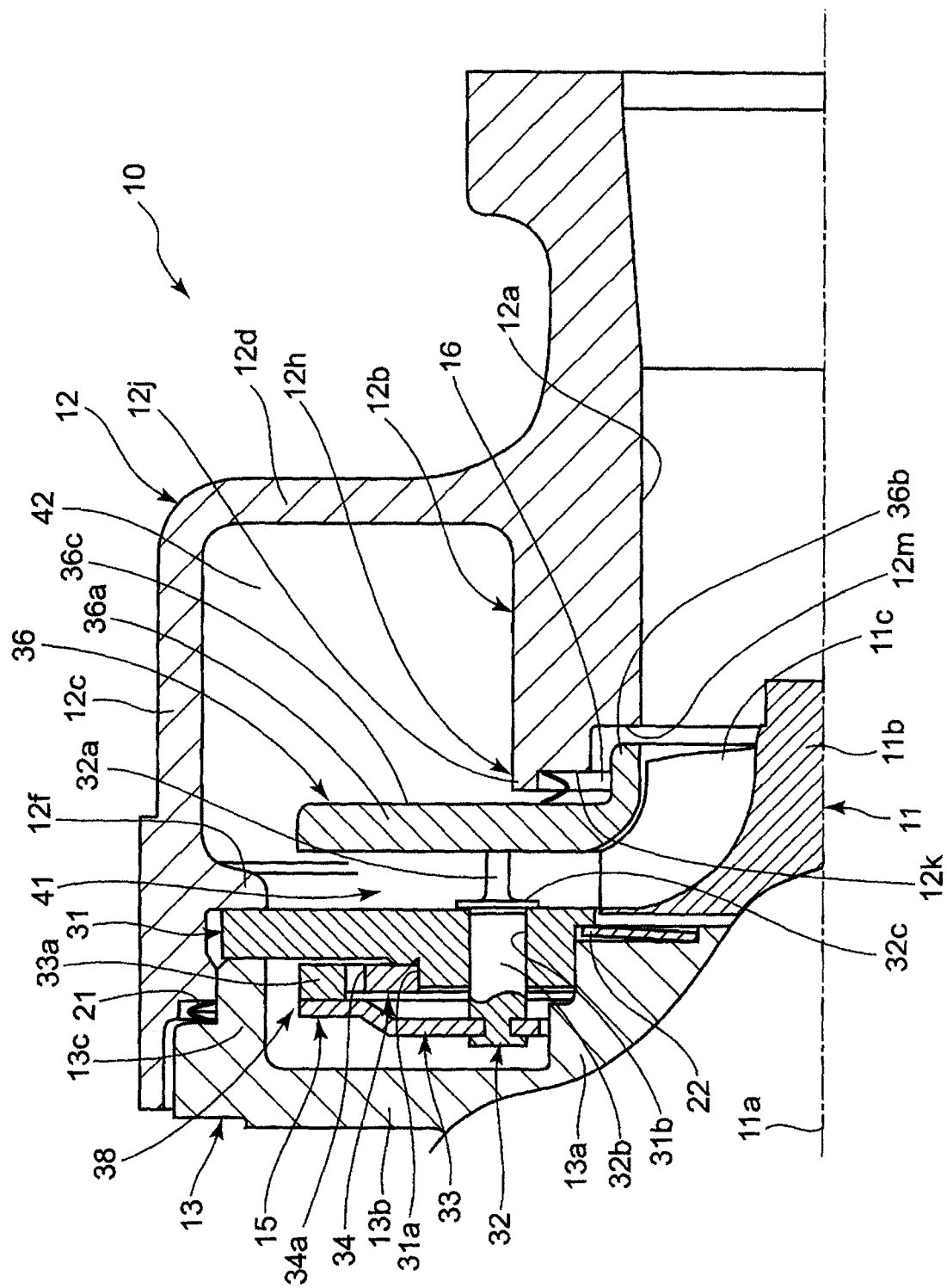
FIG. 1 is a cross-sectional view of a turbocharger to which a seal ring mounting method according to a first embodiment of the present invention is applied.

As illustrated in FIG. 1, a turbocharger 10 comprises a turbine housing 12 for accommodating a turbine wheel 11 rotatably, a bearing housing 13 for supporting a rotation shaft of the turbine wheel 11 rotatably and attached next to the turbine housing 12, a nozzle assembly 15 disposed between the turbine housing 12 and the bearing housing 13 on their inner side to adjust a flow of exhaust gas flowing toward the turbine wheel 11, and a seal ring 16 mounted to seal a gap between the turbine housing 12 and the nozzle assembly 15. The rotation shaft of the turbine wheel 11 is not shown in the drawing. An axis 11a of the rotation shaft of the turbine wheel 11 is illustrated in the drawing. As illustrated in the drawing, a seal ring 21 is provided between the turbine housing 12 and the bearing housing 13 to seal a gap therebetween, and disc spring back plate 22 is provided between the bearing housing 13 and the nozzle assembly 15 (i.e. a nozzle mount 31) to seal a gap therebetween.

For the sections of the above seal rings 16, 21, solid black is used instead of hatching (the same applies hereinafter).

The turbine wheel 11 comprises a hub 11b disposed at one end of the rotation shaft and a plurality of turbine blades 11c disposed on an outer peripheral surface of the hub 11b.

The turbine housing 12 comprises a inner peripheral wall 12b of a tubular shape which forms an exhaust gas discharge port 12a disposed on an exhaust-gas downstream side of the turbine wheel 11, an outer peripheral wall 12c of a tubular shape formed outside the inner peripheral wall 12b in the radial direction to surround the inner peripheral wall 12b, and an annular wall 12d extending outward in the radial direction from a midsection of the inner peripheral wall 12b to an end of the outer peripheral wall 12c.

The bearing housing 13 comprises an inner peripheral wall 13a of a tubular shape for supporting the rotation shaft of the turbine wheel 11, an annular wall 13b rising outward in the radial direction from the inner peripheral wall 13a, and an outer peripheral wall 13c of a tubular shape continuing to an outer peripheral edge of the annular wall 13b.

The nozzle assembly 15 comprises an annular nozzle mount 31 sandwiched and fixed between an inward flange 12f formed on the outer peripheral wall 12c of the turbine housing 12 and the outer peripheral wall 13c of the bearing housing 13, a plurality of nozzles 32 rotatably attached to the nozzle mount 31 to be aligned in the circumferential direction, a plurality of lever plates 33 having ends attached to respective ends of the nozzles 32, a drive ring 34 having grooves 34a on an outer peripheral part so that the grooves 34a engage with engagement projections 33a disposed at other ends of the lever plates 33, respectively, and being rotatably fitted at its inner peripheral part to a small-diameter part 31a of the nozzle mount 31, and an annular nozzle plate 36 attached to the nozzle mount 31 such as to sandwich nozzle vanes 32a constituting the nozzles 32 between the nozzle mount 31 and the nozzle plate 36.

The above nozzle assembly 15 and an actuator (not shown) constitute a variable nozzle mechanism 38. The actuator is connected to the drive ring 34 of the nozzle assembly 15 to rotate the drive ring 34.

More specifically, by rotating the drive ring 34 by means of the actuator, each of the lever plates 33 is caused to swing in a constant direction relative to the nozzle mount 31, and the rotation of the nozzle 32 causes change in the angle of the nozzle vane 32a.

The nozzle 32 is a member integrally formed by the nozzle vane 32a, a nozzle shaft 32b constituting a rotary shaft of the nozzle vane 32a, and a flange 32c for regulating a position of the nozzle 32 in the axial direction. The nozzle shaft 32b is rotatably fitted in a bearing hole 31b formed in the nozzle mount 31. To an end of the nozzle shaft 32b, the lever plate 33 is fixed by caulking.

The nozzle plate 36 is an integrally molded body including an annular plate part 36a and a tubular part 36b. The tubular part 36b extends from an inner peripheral end of the plate part 36a in the axial direction of the turbine wheel 11 along an outer profile of the turbine blade 11c of the turbine wheel 11 while keeping a certain clearance from the outer profile of the turbine blade 11c.

The nozzle mount 31 and the nozzle plate 36 together form an exhaust gas passage 41 where the exhaust gas flows. This exhaust gas passage 41 is a midway passage for the exhaust gas between a scroll 42 of a spiral shape formed in the turbine housing 12 and the turbine wheel 11.

Therefore, by changing the vane angle of the nozzle vane 32a disposed in the exhaust gas passage 41 using the variable nozzle mechanism 38, it is possible to change the flow rate of the exhaust gas acting in the turbine wheel 11, and hence control a supercharging pressure of a compressor provided in the turbocharger 10.

At a tip portion 12h of the inner peripheral wall 12b of the turbine housing 12, an annular projection 12j, a first step portion 12k and a second step portion 12m are formed. The annular projection 12j extends at an outer peripheral edge of the tip portion 12h along the rotation axis of the turbine wheel 11. The first step portion 12k is disposed on an inner peripheral side of the annular projection 12j. The second step portion 12m is disposed on an inner peripheral side of the first step portion 12k.

The seal ring 16 is mounted in such a state that the seal ring 16 is compressed between the first step portion 12k of the tip portion 12h disposed on the inner peripheral wall 12b of the turbine housing 12 and the side surface 36c of the plate part 36a of the nozzle plate 36. The outer peripheral part of the seal ring 16 is restricted by the annular projection 12j of the tip portion 12h disposed on the inner peripheral wall 12b of the turbine housing 12 so that a position of the seal ring 16 is restricted in the radial direction of the seal ring 16.

The step portion 12m serves to avoid interference with the tubular part 36b of the nozzle plate 36.

Figure 2:
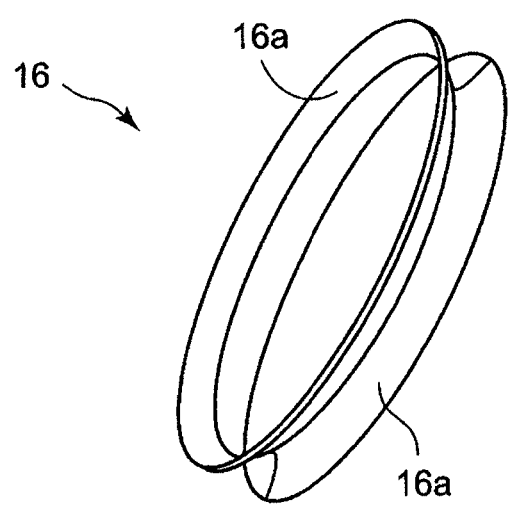
FIG. 2 is an oblique of a seal ring according to the first embodiment of the present invention.

The seal ring 16 illustrated in FIG. 2 has two taper portions 16a, 16a of the same shape. These taper portions 16a, 16a are integrally connected to each other at small diameter edge portions to form the annular seal member 16. The annular seal member 16 has a V-shaped cross-section such that a center of a width of the seal ring 16 is depressed inward in the radial direction, as illustrated in FIG. 1, and is made of an alloy having excellent heat resistance and corrosion resistance. For example, nickel-chromium heat-resistant alloy "Inconel" (registered trademark) may be used.

A procedure for mounting the above-described seal ring 16 is now explained.

Figure 3A:
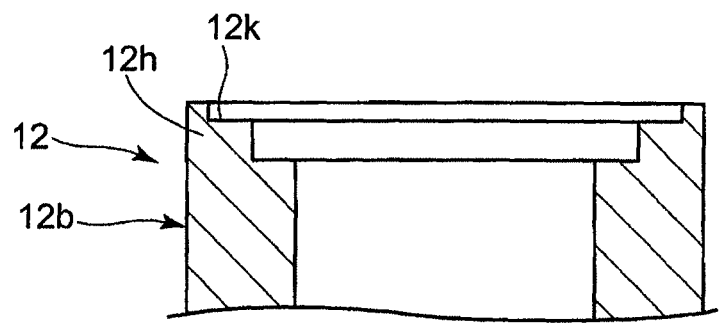
FIG. 3A is an explanatory drawing of the seal ring mounting method for a turbocharger according to the first embodiment of the present invention in the state where a tip portion of the inner peripheral wall of a turbine housing faces up.

As illustrated in FIG. 3A, the turbine housing 12 is arranged such that the tip portion 12h of the inner peripheral wall 12b of the turbine housing 12 faces upward.

Figure 3B:
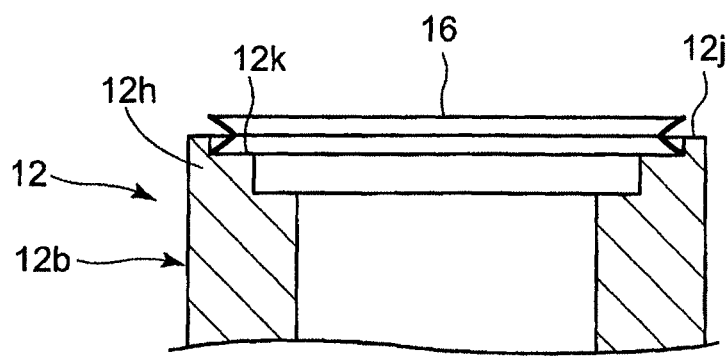
FIG. 3B is an explanatory drawing of the seal ring mounting method for a turbocharger according to the first embodiment of the present invention in the state where the seal ring is placed on the tip portion of the inner peripheral wall of the turbine housing.

Next, as illustrated in FIG. 3B, the seal ring 16 is placed on the tip portion 12h of the inner peripheral wall 12b, more particularly, on the first step portion 12k of the end portion 12h. At this time, the seal ring 16 is restricted in the radial direction at its outer peripheral portion by the annular projection 12j formed in the end portion 12h of the inner peripheral wall 12b.

Figure 3C:
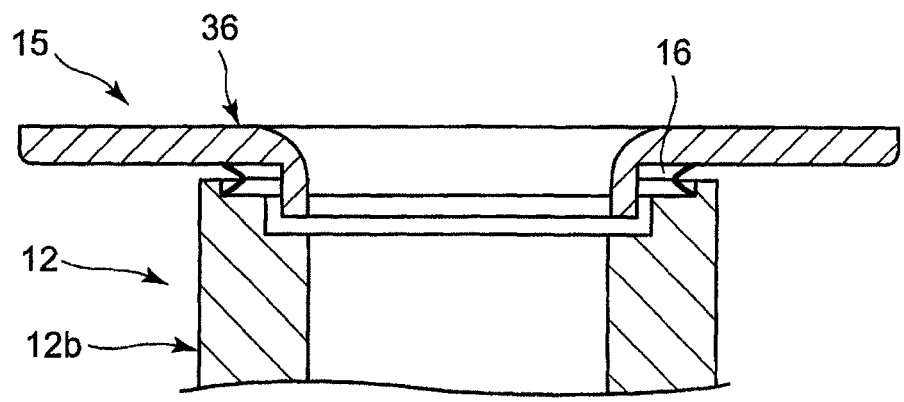
FIG. 3C is an explanatory drawing of the seal ring mounting method for a turbocharger according to the first embodiment of the present invention in the state where a nozzle plate is placed on the seal ring.

Next, as illustrated in FIG. 3C, the nozzle assembly 15 (here, shows only the nozzle plate 36) is placed on the turbine housing 12 to cover the seal ring 16 from above.

Thus, in the assembly process of the turbocharger, the seal ring 16 is mounted at a prescribed position while being regulated by the inner peripheral wall 12b of the turbine housing 12, and thus the assembly of the turbocharger can proceed smoothly without problems.

Now, a description will be given regarding the effect of other components on the seal ring 16.

Figure 4A:
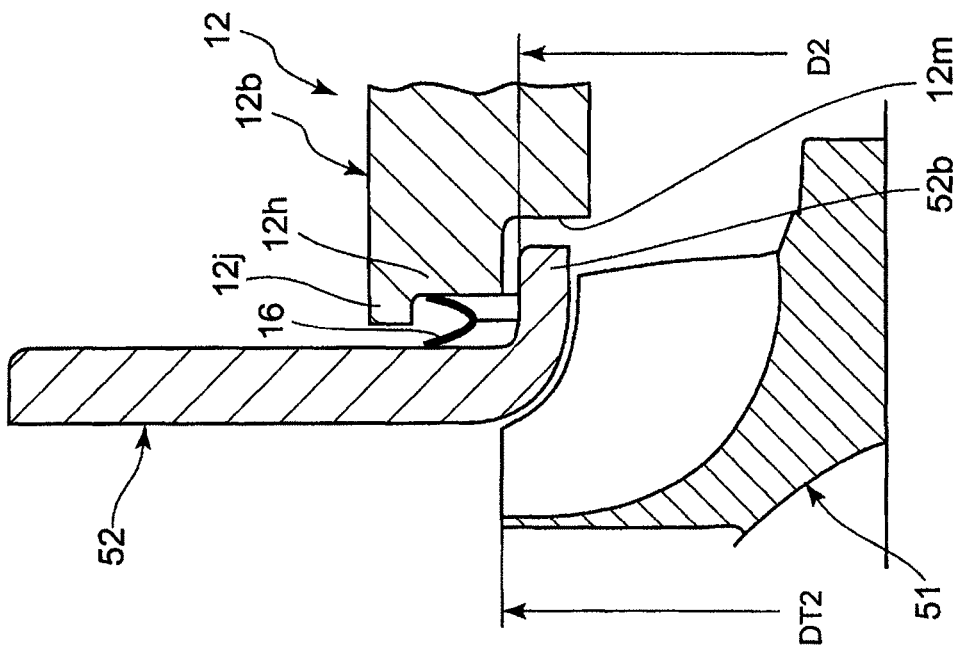
FIG. 4A is an explanatory drawing of a function of the turbocharger according to an embodiment of the present invention, illustrating an effect of heat on the seal ring.

As illustrated in FIG. 4A, when the temperature inside the turbocharger becomes high by the exhaust gas flowing through the turbocharger, as the nozzle plate 36 is thin compared to other parts of the turbine housing 12, for example, the tubular part 36b of the nozzle plate 36 thermally deforms to a position indicated by a two-dot chain line.

However, since the outer peripheral part of the seal ring 16 is regulated by the annular projection 12j, it is possible to secure a large clearance between the tubular part 36b of the nozzle plate 36 and the inner peripheral part of the seal ring 16, and thus even if the outer diameter of the tubular part 36b becomes larger due to the thermal deformation, the seal ring 16 is hardly affected by this.

Further, as an effect of the shape of the seal ring 16, with the V-shaped cross-section of the seal ring 16 where an open side of the "V" shape is disposed facing the scroll 42, when the pressure on the scroll 42 side is higher than the pressure on the exhaust gas discharge port 12a side, the pressure on the open side of the "V" shape of the seal ring 16 acts to press both edges of the seal ring 16 against the first step portion 12k and the side surface 36c of the nozzle plate 36. This enhances adhesion to of both edges of the seal ring 16 to the side surface 36c of the nozzle plate 36 and the first step portion 12k, thereby improving the sealing performance.

Now, a general purpose of the seal ring 16 is explained.

As illustrated in FIG. 4A, the outer diameter of the turbine wheel 11 illustrated in FIG. 4A is a DT1. When this turbine wheel 11 is changed to a turbine wheel 51 illustrated in FIG. 4B (having the outer diameter DT2 (>DT1)) and accordingly the nozzle plate 36 illustrated in FIG. 4A is changed to a nozzle plate 52 illustrated in FIG. 4B, the outer diameter of the tubular part 52b of the nozzle plate 52 becomes D2 (>D1).

Thus, even if the outer diameter D2 of the tubular part 52b of the nozzle plate 52 is increased, the seal ring 16, whose inner peripheral part is not regulated in the radial direction, is not affected by the change in the outer diameter of the tubular part 52b. That is, the seal ring 16 can be commonly used for turbochargers of different models or the like.

Second Embodiment

As for the second embodiment, the same reference numerals are used for the same configuration as the first embodiment, and detailed description thereof is omitted.

Figure 5:
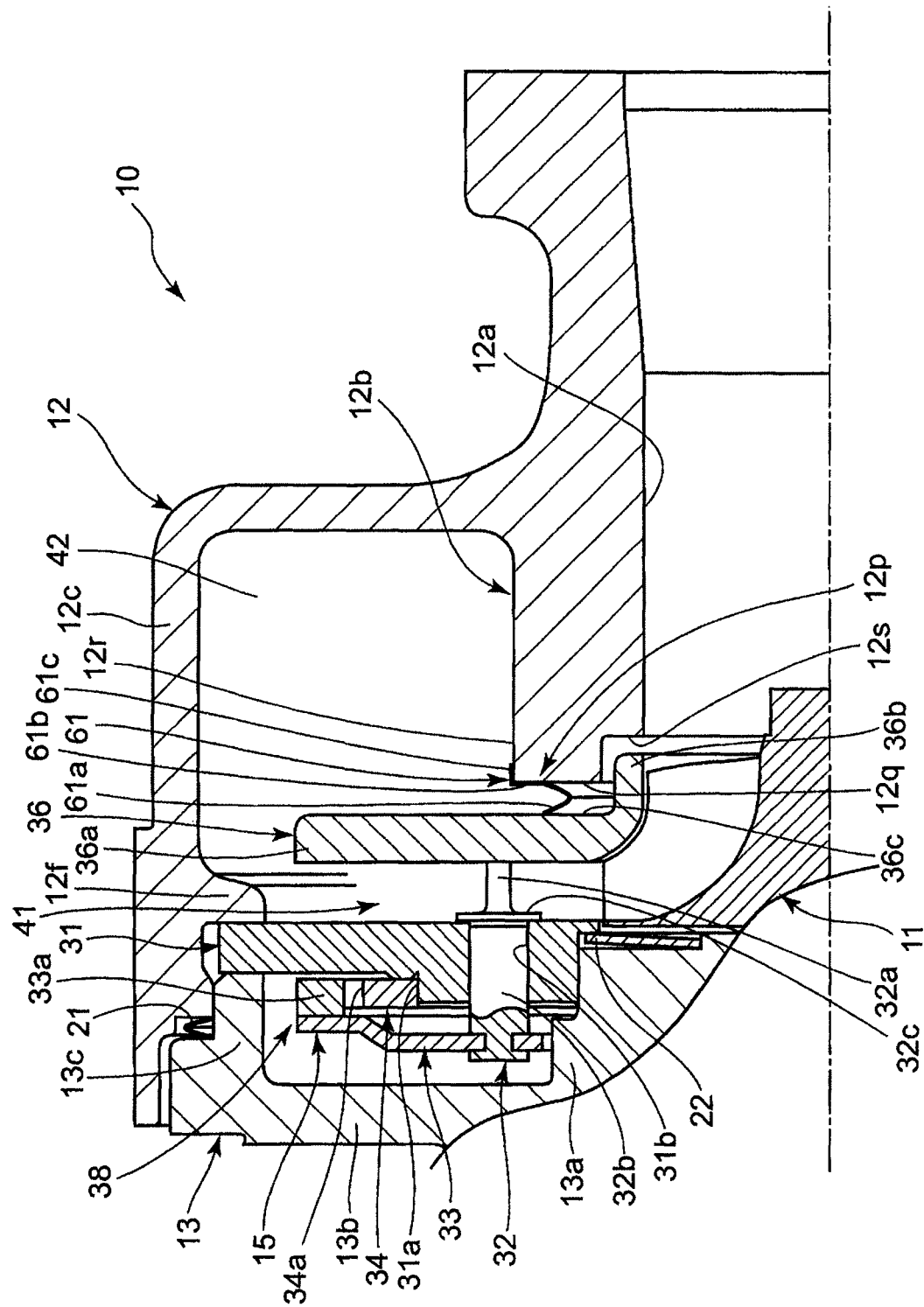
FIG. 5 is a cross-sectional view of a turbocharger to which a seal ring mounting method according to a second embodiment of the present invention is applied.

As illustrated in FIG. 5, the turbocharger 10 comprises a seal ring 61 mounted to seal a gap between the turbine housing 12 and the nozzle assembly 15.

The turbine housing 12 comprises a tip portion 12p of the inner peripheral wall 12b, an end surface 12q opposing the side surface 36c of the nozzle plate 36, an outer peripheral surface 12r and a step portion 12s to avoid interference with the tubular part 36b of the nozzle plate 36.

Figure 6:
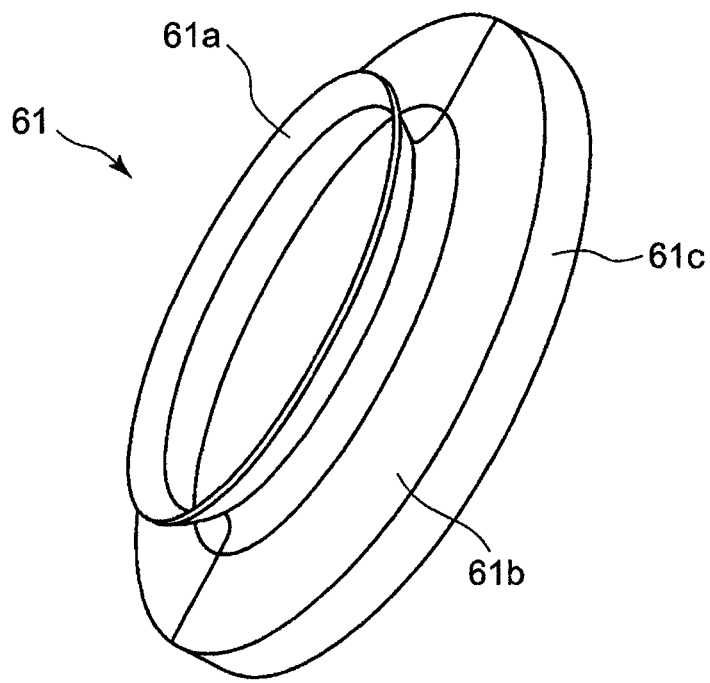
FIG. 6 is an oblique of the seal ring according to the second embodiment of the present invention.

In FIG. 5 and FIG. 6, the seal ring 61 is a component of Inconel (registered trademark) which is integrally formed by an elastic annular seal body 61a having a V-shaped cross-section formed such that a center of a width of the seal body 61a is depressed inward in the radial direction, an annular plate part 61b extending outward in the radial direction from one side of the seal body 61a, and a cylindrical part 61c extending from an outer peripheral edge of the annular plate part 61b in the direction opposite to the seal body 61a with respect to the annular plate part 62b (in the direction perpendicular to the radial direction of the seal body 61a).

For instance, if the seal ring 16 is composed of only the seal body 61a and the cylindrical part 61c, there is a possibility that one of the outer edges of the seal body 61a contacts a corner between the end surface 12q of the tip portion 12p and the outer peripheral surface 12 in the inner peripheral wall 12b of the turbine housing 12 and the sealing surface cannot be secured. Therefore, the seal ring 61 is additionally provided with the annular plate part 61b which extends along the end surface 12q to be in close contact with the end face 12q.

The seal body 61a has the same shape as the seal ring 16 shown in the first embodiment (FIG. 1 and FIG. 2).

In FIG. 5, the seal body 61a of the seal ring 61 is disposed in a compressed state between the end surface 12q of the tip portion 12p of the inner peripheral wall 12b of the turbine housing 12 and the side surface 36c of the plate part 36a of the nozzle plate 36. The annular plate part 61b of the seal ring 61 extends along the end surface 12q of the end portion 12p, and the cylindrical part 61c of the seal ring 61 is fitted to the outer peripheral surface 12r of the tip portion 12p to be regulated in the radial direction of the seal ring 61.

Figure 7:
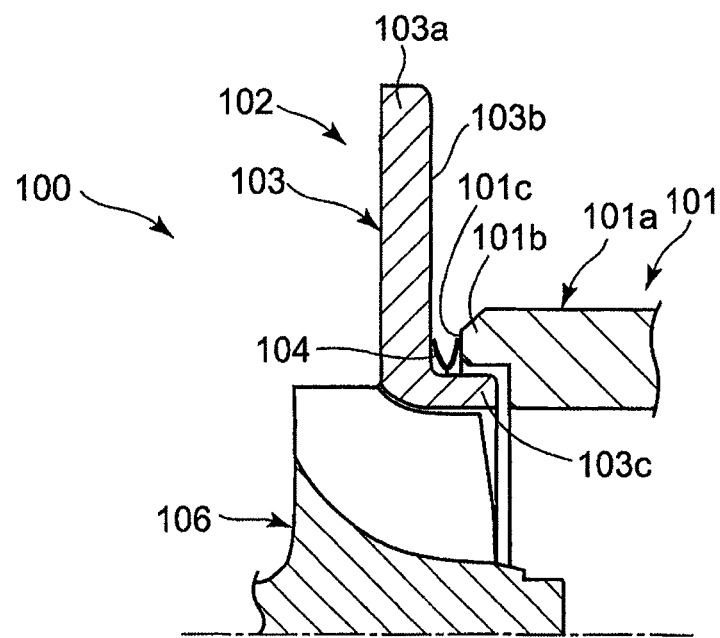
FIG. 7 is a cross-sectional view of a main part of the turbocharger to which a seal ring mounting method (comparison example) is applied.

As illustrated in FIG. 7, in a turbocharger 100 of a comparative example, a seal ring 104 is disposed in a compressed state between a side surface 103b of a plate part 103a of a nozzle plate 103 constituting a nozzle assembly 102 and an end portion 101b of an inner peripheral wall 101a of a turbine housing 101 (i.e. an end surface 101c of the end portion 101b). The seal ring 104 has elasticity and has a V-shaped cross-section formed such that a center of a width of the seal ring is depressed inward in the radial direction. The inner peripheral part of the seal ring 104 is restricted in the radial direction by a tubular part 103c disposed on the inner peripheral side of the nozzle plate 103. Reference numeral 106 is a turbine wheel which is rotatably accommodated in the turbine housing 101.

A procedure for mounting the above-described seal ring 104 of the comparison example is now explained.

Figure 8:
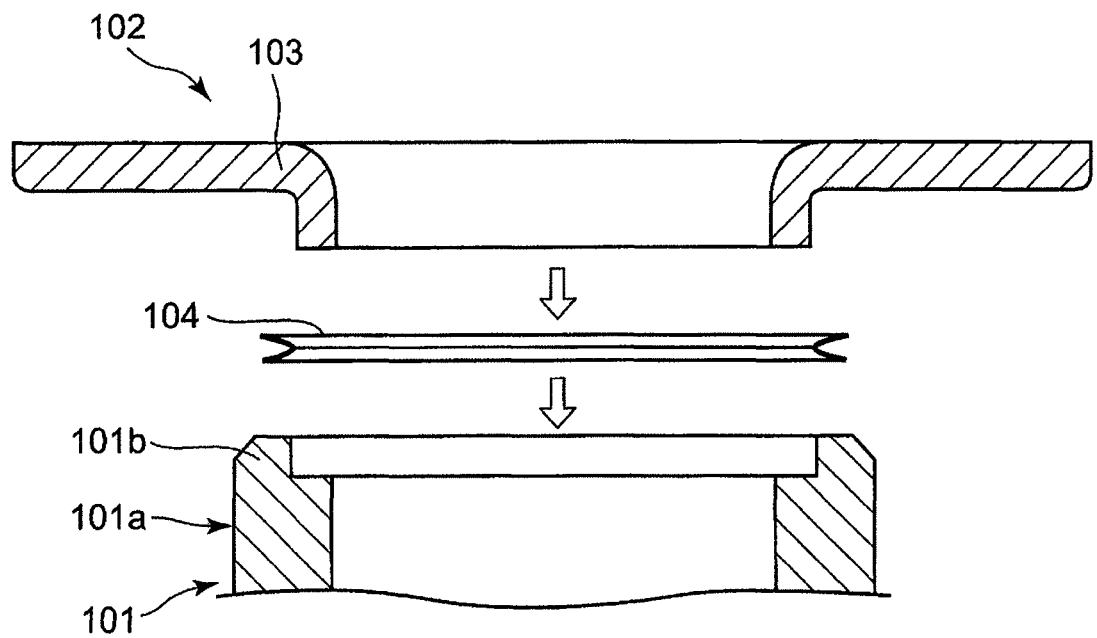
FIG. 8 is an explanatory drawing of the seal ring mounting method (comparison example).

As indicated by white arrows in FIG. 8, the turbine housing 101 is arranged such that the tip portion 101b of the inner peripheral wall 101a of the turbine housing 101 faces upward. Next, the seal ring 104 is placed on the tip portion 101b, and the nozzle assembly 102 is placed on the turbine housing 101 (here, shows only the nozzle plate 103) to cover the seal ring 104 from above.

In the above process, when mounting the seal ring 104 to the tip portion 101b of the inner peripheral wall 101a, restricting of the seal ring 104 in the radial direction is not performed and thus, there is a chance that the seal ring 104 is mounted eccentrically to the tip portion 101b or the seal ring 104 falls off from the tip portion 101b. This makes it difficult to mount the nozzle assembly 102 in the next step.

In contrast, in the present embodiment, as illustrated in FIG. 3B, the seal ring 16 is mounted in place while being regulated by the inner peripheral wall 12b of the turbine housing 12. Thus, the assembly process of the turbocharger can be performed smoothly without problems.

Now, a description will be given regarding the effect of other components on the seal ring 104.

Figure 9:
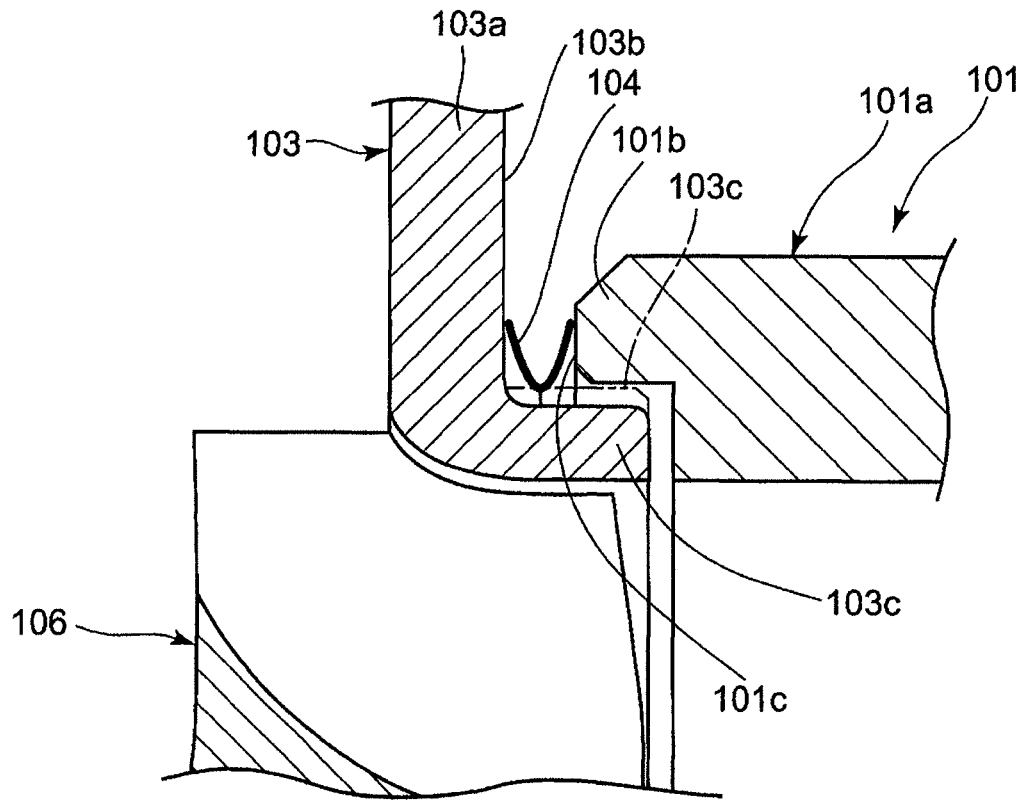
FIG. 9 is an explanatory drawing of a function of the turbocharger (comparison example).
Figure 10:
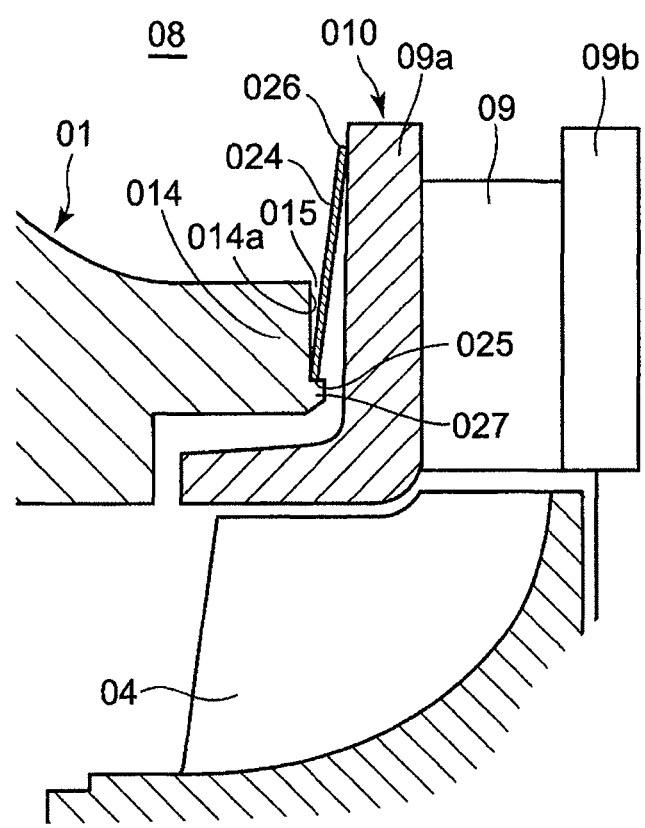
FIG. 10 is an explanatory drawing of related art.

As illustrated in FIG. 9, when the temperature inside the turbocharger becomes high by the exhaust gas flowing through the turbocharger, the nozzle plate 103 (e.g. the tubular part 103c) thermally deforms to a position indicated by a two-dot chain line.

As the outer peripheral part of the seal ring 104 is regulated by the tubular part 103c of the nozzle plate 103, when the outer diameter of the tubular part 103c increases due to the thermal expansion, the tubular part 103c interferes with the inner peripheral part of the seal ring 104, resulting in deformation of the seal ring 104.

As the deformation of the seal ring 104 progresses, elastic deformation of the seal ring 104 leads to plastic deformation. This may impair the sealing performance of the seal ring 104.

In contrast, in the present embodiment, as illustrated in FIG. 4A, the outer peripheral part of the seal ring 16 is regulated by the annular projection 12j and thus, it is possible to secure a large clearance between the tubular part 36b of the nozzle plate 36 and the inner peripheral part of the seal ring 16. Even if the outer diameter of the tubular part 36b becomes larger due to the thermal deformation, the seal ring 16 is hardly affected by this.

Therefore, it is possible to prevent deformation of the seal ring 16 and to maintain the sealing performance.

Further, in FIG. 9, in the case where the outer diameter of the turbine wheel 106 has been changed accompanying increased outer diameter of the tubular part 103c of the nozzle plate 103, if the outer diameter of the tubular part 103 is larger than the inner peripheral part of the seal ring 104, it is impossible to fit the seal ring 104 to the tubular part 103c. Thus, it is necessary to prepare seal rings 104 having inner peripheral parts of different inner diameters, depending on the outer diameter of the turbine wheel 106. This can be costly.

Figure 4B:
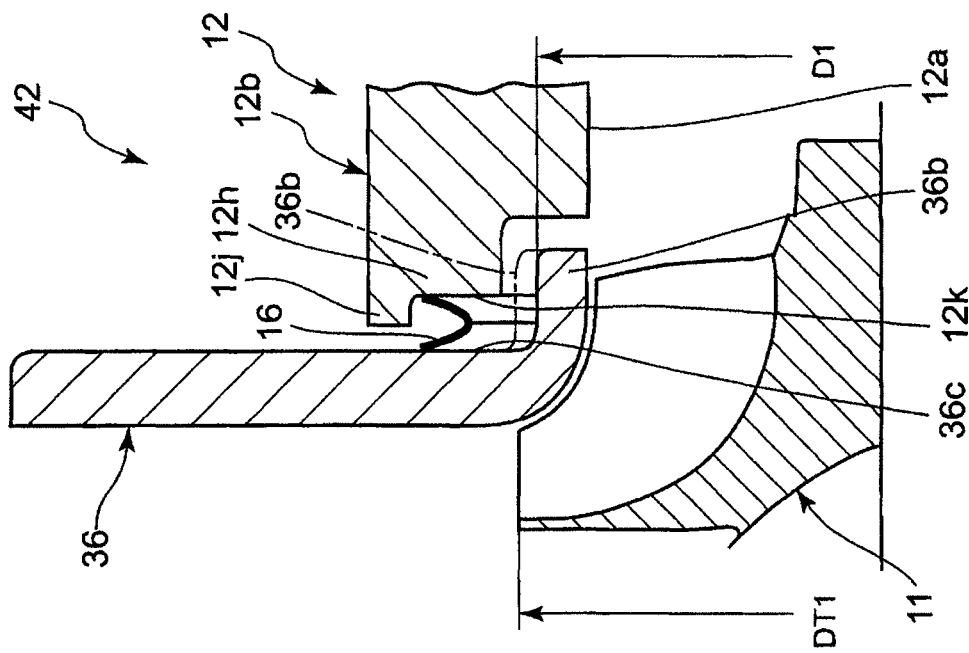
FIG. 4B is an explanatory drawing of a function of the turbocharger according to an embodiment of the present invention, illustrating commons use of the seal ring in a turbocharger of a different model.

In contrast, in the present embodiment, as illustrated in FIG. 4A and FIG. 4B, even if the outer diameter D2 of the tubular part 52b of the nozzle plate 52 is increased, the seal ring 16, whose inner peripheral part is not regulated in the radial direction, is not affected by the change in the outer diameter of the tubular part 52b. That is, the seal ring 16 can be commonly used for turbochargers of different models or the like.

INDUSTRIAL APPLICABILITY

The present invention is suitable for a turbocharger in which the inner peripheral wall is provided in the turbine housing to regulate the outer puerperal part of the seal ring.

The invention claimed is:
1. A turbocharger comprising:
a scroll formed in a turbine housing;
a plurality of nozzle vanes provided on an inner peripheral side in a radial direction of the scroll;
a turbine wheel arranged on an inner peripheral side relative to the plurality of nozzle vanes;
an annular nozzle mount;
an annular nozzle plate attached to the annular nozzle mount, the annular nozzle plate and the annular nozzle mount being arranged sandwiching the plurality of nozzle vanes on the inner peripheral side in the radial direction of the scroll to rotatably support the plurality of nozzle vanes;
an annular seal ring arranged to seal a gap between a side face of the annular nozzle plate and an end face of an inner peripheral wall of the turbine housing in a rotation axis direction of the turbine wheel, the inner peripheral wall of the turbine housing being provided opposing the side face of the annular nozzle plate to form an inner wall of the scroll, the inner peripheral wall of the turbine housing having a tubular shape to form an exhaust gas discharge port disposed on an exhaust-gas downstream side of the turbine wheel; and
a radial-direction restriction part provided at a tip portion of the inner peripheral wall of the turbine housing and on an outer peripheral side relative to the radial direction of the annual seal ring so as to restrict an outer peripheral part of the seal ring in a radial direction,
wherein the seal ring is mounted between the side face of the annular nozzle plate and the end face of the inner peripheral wall of the turbine housing in the rotation axis direction of the turbine wheel in such a state that the seal ring is compressed in the rotation axis direction of the turbine wheel so that the outer peripheral part of the seal ring is restricted by the radial-direction restriction part, and
wherein the annular seal ring is integrally formed by:
a seal body part;
an annular plate part extending outward in a radial direction from one side of the seal body part; and
a cylindrical part extending from an outer peripheral edge of the annular plate part in a direction opposite to the seal body part with the annular plate part.
2. The turbocharger according to claim 1,
wherein the radial-direction restriction part is constituted by an outer peripheral surface disposed at the tip portion of the inner peripheral wall of the turbine housing.
3. The turbocharger according to claim 1,
wherein the annular seal ring has a V-shaped cross-section formed such that a center of a width of the annular seal ring is depressed inward in the radial direction.
4. The turbocharger according to claim 2,
wherein the annular seal ring has a V-shaped cross-section formed such that a center of a width of the annular seal ring is depressed inward in the radial direction.

* * * * *